(12) United States Patent
Harris et al.

(10) Patent No.: US 7,738,153 B2
(45) Date of Patent: Jun. 15, 2010

(54) MAGNETIC FIELD POSITION FEEDBACK FOR HOLOGRAPHIC STORAGE SCANNER

(75) Inventors: Rodney C. Harris, Fort Collins, CO (US); Keith W. Malang, Longmont, CO (US)

(73) Assignee: Inphase Technologies, Inc., Longmont, CO (US)

( * ) Notice: Subject to any disclaimer, the term of this patent is extended or adjusted under 35 U.S.C. 154(b) by 301 days.

(21) Appl. No.: 11/851,413

(22) Filed: Sep. 7, 2007

(65) Prior Publication Data

US 2008/0080031 A1 Apr. 3, 2008

Related U.S. Application Data

(60) Provisional application No. 60/847,923, filed on Sep. 29, 2006.

(51) Int. Cl.
*G02B 26/08* (2006.01)
(52) U.S. Cl. .................................. 359/212.1
(58) Field of Classification Search .......... 359/212.1, 359/223.1–226.1, 871, 872; 250/234–236
See application file for complete search history.

(56) References Cited

U.S. PATENT DOCUMENTS

| | | | |
|---|---|---|---|
| 5,082,337 | A | 1/1992 | Chern et al. |
| 5,898,544 | A | 4/1999 | Krinke et al. |
| 5,959,281 | A | 9/1999 | Domiteaux |
| 6,103,454 | A | 8/2000 | Dhar et al. |
| 6,445,481 | B2 * | 9/2002 | Aoki ................... 359/198.1 |
| 6,482,551 | B1 | 11/2002 | Dhar et al. |
| 6,538,799 | B2 | 3/2003 | McClelland et al. |
| 6,650,447 | B2 | 11/2003 | Curtis et al. |
| 6,743,552 | B2 | 6/2004 | Setthachayanon et al. |

(Continued)

FOREIGN PATENT DOCUMENTS

EP 1 422 698 A2 5/2004

(Continued)

OTHER PUBLICATIONS

PCT/US07/77822 International Search Report and the Written Opinion of the International Searching Authority, or the Declaration, mailed Mar. 20, 2008.

(Continued)

*Primary Examiner*—Euncha P Cherry
(74) *Attorney, Agent, or Firm*—Vedder Price P.C.; Ajay A. Jagtiani (57) ABSTRACT

The present invention provides a scanner comprising: a base member; a scanning beam reflective member having a first tilt axis and a second tilt axis orthogonal to the first tilt axis; a mounting assembly for mounting the scanning beam reflective member on the base member for tilting of thereof along the first and second tilt axes; an actuator for tilting the scanning beam reflective member along the first and second tilt axes to provide a tilt orientation; a magnet assembly which generates one or more magnetic fields which are responsive and correlated to the tilt orientation; and a magnetic field sensor assembly for sensing the magnetic fields generated by the magnet assembly to thereby indicate the tilt orientation. The mounting assembly may comprise a suspension assembly having a tilt imparting assembly for imparting tilt to the reflective member, and a reflective member holder assembly for holding the reflective member.

17 Claims, 8 Drawing Sheets

U.S. PATENT DOCUMENTS

| | | | |
|---|---|---|---|
| 6,765,061 | B2 | 7/2004 | Dhar et al. |
| 6,780,546 | B2 | 8/2004 | Trentler et al. |
| 6,801,260 | B1 | 10/2004 | Veksland et al. |
| 6,972,885 | B2 | 12/2005 | Hiley et al. |
| 7,123,416 | B1 | 10/2006 | Erdogan et al. |
| 7,145,330 | B2 | 12/2006 | Xiao |
| 7,411,708 | B2 | 8/2008 | Waldman et al. |
| 2002/0162939 | A1 | 11/2002 | Heidrich |
| 2002/0166893 | A1 | 11/2002 | Li et al. |
| 2002/0176181 | A1 | 11/2002 | Jacobsen |
| 2003/0034552 | A1 | 2/2003 | Wada et al. |
| 2003/0047608 | A1 | 3/2003 | Huss et al. |
| 2003/0206320 | A1 | 11/2003 | Cole et al. |
| 2004/0027625 | A1 | 2/2004 | Trentler et al. |
| 2004/0150872 | A1 | 8/2004 | Neukermans et al. |
| 2004/0213464 | A1 | 10/2004 | Hanson et al. |
| 2006/0006305 | A1 | 1/2006 | Fukai |
| 2006/0274391 | A1 | 12/2006 | Dickson et al. |
| 2006/0279821 | A1 | 12/2006 | Riley et al. |
| 2007/0091399 | A1 | 4/2007 | Ihas et al. |

FOREIGN PATENT DOCUMENTS

EP    1 457 974 A1    9/2004

OTHER PUBLICATIONS

PCT/US07/05636 International Search Report and the Written Opinion of the International Searching Authority, or the Declaration, mailed Mar. 13, 2008.

Urey, et al. "Scanner Design and Resolution Tradeoffs for Miniature Scanning Displays," Conference on Flat Panel Display Tech & Display Metrology, Proceedings of SPIE, vol. 3636, pp. 60-68, 1999.

PCT/US07/75176 International Search Report and the Written Opinion of the International Searching Authority, or the Declaration mailed Apr. 3, 2008.

PCT/US07/81378 International Search Report and the Written Opinion of the International Searching Authority, or the Declaration, mailed May 7, 2008.

PCT/US2008/060014 International Search Report and the Written Opinion of the International Searching Authority, or the Declaration, mailed Aug. 8, 2008.

PCT/US2007/076979 International Search Report and the Written Opinion of the International Searching Authority, or the Declaration, mailed Aug. 20, 2008.

McLeod et al., "Micro-Holographic Multi-Layer Optical Disk Data Storage," International Symposium on Optical Memory and Optical Data Storage (Jul. 2005).

Psaltis et al., "Holographic Memories," Scientific American, Nov. 1995.

PCT/US2007/005636 International Preliminary Report on Patentability (Chap. 1 of the Patent Cooperation Treaty) and the Written Opinion of the International Searching Authority, mailed Sep. 18, 2008.

Shannon, Robert R., "Optical Transfer Function Basics," Cambridge University Press (XP-002549211), Dec. 31, 1997, pp. 268-275.

EP 07 841 458.8 Supplementary European Search Report mailed Oct. 23, 2009.

* cited by examiner

MAGNETIC FIELD POSITION FEEDBACK FOR HOLOGRAPHIC STORAGE SCANNER

CROSS-REFERENCE TO RELATED APPLICATIONS

This application makes reference to and claims the priority date of the following U.S. Provisional Patent Application: U.S. Provisional Patent Application No. 60/847,923, entitled "Magnetic Field Position Feedback for Holographic Storage Scanner," filed Sep. 29, 2006. The entire disclosure and contents of the above application is hereby incorporated by reference.

STATEMENT OF JOINT RESEARCH AGREEMENT

In compliance with 37 C.F.R. §1.71(g) (1), disclosure is herein made that the claimed invention was made pursuant to a Joint Research Agreement as defined in 35 U.S.C. 103 (c) (3), that was in effect on or before the date the claimed invention was made, and as a result of activities undertaken within the scope of the Joint Research Agreement, by or on the behalf of Nintendo Co., Ltd. and InPhase Technologies, Inc.

BACKGROUND

1. Field of the Invention

The present invention broadly relates to generally to a scanner provided with two-axis tilting of the scanning beam reflective member which may be used in reading holographic data. The present invention further broadly relates to such a scanner having an assembly which provides the scanner with position feedback on the tilt axis orientation of the reflective member.

2. Related Art

Developers of information storage devices and methods continue to seek increased storage capacity. As part of this development, holographic memory systems have been suggested as alternatives to conventional memory devices. Holographic memory systems may be designed to record data as one bit of information (i.e., bit-wise data storage). See McLeod et al. "Micro-Holographic Multi-Layer Optical Disk Data Storage," *International Symposium on Optical Memory and Optical Data Storage* (July 2005). Holographic memory systems may also be designed to record an array of data that may be a 1-dimensional linear array (i.e., a 1×N array, where N is the number linear data bits), or a 2-dimensional array commonly referred to as a "page-wise" memory system. Page-wise memory systems may involve the storage and readout of an entire two-dimensional representation, e.g., a page of data. Typically, recording light passes through a two-dimensional array of low and high transparency areas representing data, and the system stores, in three dimensions, the pages of data holographically as patterns of varying refractive index imprinted into a storage medium. See Psaltis et al., "Holographic Memories," *Scientific American*, November 1995, where holographic systems are discussed generally, including page-wise memory systems.

Holographic data storage systems may perform a data write (also referred to as a data record or data store operation, simply "write" operation herein) by combining two coherent light beams, such as laser beams, at a particular point within the storage medium. Specifically, a data-encoded light beam may be combined with a reference light beam to create an interference pattern in the holographic storage medium. The pattern created by the interference of the data beam and the reference beam forms a hologram which may then be recorded in the holographic medium. If the data-bearing beam is encoded by passing the data beam through, for example, a spatial light modulator (SLM), the hologram(s) may be recorded in the holographic medium.

Holographically-stored data may then be retrieved from the holographic data storage system by performing a read (or reconstruction) of the stored data. The read operation may be performed by projecting a reconstruction or probe beam into the storage medium at the same angle, wavelength, phase, position, etc., as the reference beam used to record the data, or compensated equivalents thereof. The hologram and the reconstruction or probe beam interact to reconstruct the data beam.

A technique for increasing data storage capacity is by multiplexing holograms. Multiplexing holograms involves storing multiple holograms in the holographic storage medium, often in the same volume or nearly the same volume of the medium. Multiplexing may carried out by varying an angle, wavelength, phase code, etc., in recording and then later reading out the recorded holograms. Many of these methods rely on a holographic phenomenon known as the Bragg effect to separate the holograms even though they are physically located within the same volume of media. Other multiplexing methods such as shift and, to some extent correlation, use the Bragg effect and relative motion of the media and input laser beams to overlap multiple holograms in the same volume of the media.

In angle multiplexing, multiple holograms may be stored in the same volume of the holographic storage medium by varying the angle of the reference beam during recording. For example, data pages may be recorded in the holographic storage medium at many angles, the exhausting the dynamic range or "address space" of a given volume of the medium. Each location in the "address space" (or each data page) corresponds to the angle of a reference beam. During recording, the reference beam scans through many discrete angles as data pages are written. Conversely, during readout, a conjugate reference beam (sometimes referred to as a "probe beam") may probe each data page at its corresponding angle. The scanner may be used for either recording or readout.

SUMMARY

According to a first broad aspect of the present invention, there is provided a device comprising a scanner comprising:
  a base member;
  a scanning beam reflective member having a first tilt axis and a second tilt axis orthogonal to the first tilt axis;
  a reflective member mounting assembly for mounting the reflective member on the base member for tilting of the reflective member along the first and second tilt axes;
  an actuator for causing the reflective member mounting assembly to tilt the reflective member along at least one of the first and second tilt axes to provide a tilt orientation;
  a magnet assembly which generates one or more magnetic fields which are responsive and correlated to the tilt orientation; and
  a magnetic field sensor assembly for sensing the magnetic fields generated by the magnet assembly to thereby indicate the tilt orientation.

According to a second broad aspect of the invention, there is provided a device comprising a scanner comprising:

a base member;

a scanning beam reflective member having a first tilt axis and a second tilt axis orthogonal to the first tilt axis;

a scanning beam reflective member suspension assembly comprising:

a tilt imparting assembly for imparting tilt to the reflective member along at least of the first and second tilt axes to thereby provide a tilt orientation and which is mounted on the base member; and a reflective member holder assembly for holding the reflective member and which is connected the tilt imparting assembly; and an actuator for causing the tilt imparting assembly to impart tilt to the reflective member to thereby provide the tilt orientation.

BRIEF DESCRIPTION OF THE DRAWINGS

The invention will be described in conjunction with the accompanying drawings, in which.

DETAILED DESCRIPTION

It is advantageous to define several terms before describing the invention. It should be appreciated that the following definitions are used throughout this application.

DEFINITIONS

Where the definition of terms departs from the commonly used meaning of the term, applicant intends to utilize the definitions provided below, unless specifically indicated.

For the purposes of the present invention, directional terms such as "top", "bottom", "above", "below", "left", "right", "horizontal", "vertical", "upward", "downward", etc. are merely used for convenience in describing the various embodiments of the present invention. The embodiments of the present invention may be oriented in various ways. For example, the embodiments shown in FIGS. 2 through 8 may be flipped over, rotated by 90° in any direction, etc.

For the purposes of the present invention, the term "laser" refers to conventional lasers, as well as laser emitting diodes (LEDs).

For the purposes of the present invention, the term "light source" refers to any source of electromagnetic radiation of any wavelength, for example, from a laser, etc. Suitable light sources for use in embodiments of the present invention include, but are not limited to, those obtained by conventional laser sources, e.g., the blue and green lines of $Ar^+$ (458, 488, 514 nm) and He—Cd lasers (442 nm), the green line of frequency doubled YAG lasers (532 nm), and the red lines of He—Ne (633 nm), $Kr^+$ lasers (647 and 676 nm), and various laser diodes (LDs) (e.g., emitting light having wavelengths of from 290 to 900 nm).

For the purposes of the present invention, the term "spatial light intensity" refers to a light intensity distribution or pattern of varying light intensity within a given volume of space.

For the purposes of the present invention, the terms "holographic grating," "holograph" or "hologram" (collectively and interchangeably referred to hereafter as "hologram") are used in the conventional sense of referring to an interference pattern formed when a signal beam and a reference beam interfere with each other. In cases wherein digital data is recorded, the signal beam may be encoded with a data modulator, e.g., a spatial light modulator, etc.

For the purposes of the present invention, the term "holographic recording" refers to the act of recording a hologram in a holographic storage medium.

For the purposes of the present invention, the term "multiplexing holograms" refers to recording, storing, etc., a plurality of holograms in the same volume or nearly the same volume of the holographic storage medium by varying a recording parameter(s) including, but not limited to, angle, wavelength, phase code, shift, correlation, peristrophic, etc. The multiplexed holograms that are recorded, stored, etc., may be read, retrieved, reconstructed, etc., by using the same recording parameter(s) used to record, store, etc., the respective holograms.

For the purposes of the present invention, the term "holographic storage medium" refers to a component, material, etc., that is capable of recording and storing, in three dimensions (i.e., the X, Y and Z dimensions), one or more holograms as one or more pages as patterns of varying refractive index imprinted into the medium. Examples of holographic media useful herein include, but are not limited to, those described in: U.S. Pat. No. 6,103,454 (Dhar et al.), issued Aug. 15, 2000; U.S. Pat. No. 6,482,551 (Dhar et al.), issued Nov. 19, 2002; U.S. Pat. No. 6,650,447 (Curtis et al.), issued Nov. 18, 2003, U.S. Pat. No. 6,743,552 (Setthachayanon et al.), issued Jun. 1, 2004; U.S. Pat. No. 6,765,061 (Dhar et al.), Jul. 20, 2004; U.S. Pat. No. 6,780,546 (Trentler et al.), issued Aug. 24, 2004; U.S. Patent Application No. 2003-0206320 (Cole et al), published Nov. 6, 2003, and U.S. Patent Application No. 2004-0027625 (Trentler et al.), published Feb. 12, 2004, the entire contents and disclosures of which are herein incorporated by reference.

For the purposes of the present invention, the term "data page" or "page" refers to the conventional meaning of data page as used with respect to holography. For example, a data page may be a page of data (i.e., two-dimensional assembly of data), one or more pictures, etc., to be recorded in a holographic storage medium.

For the purposes of the present invention, the term "recording light" refers to a light source used to record into a holographic storage medium. The spatial light intensity pattern of the recording light is what is recorded.

For the purposes of the present invention, the term "recording data" refers to storing or writing holographic data in a holographic medium.

For the purposes of the present invention, the term "reading data" refers to retrieving, recovering, or reconstructing holographic data stored in a holographic medium.

For the purposes of the present invention, the term "X-Y plane" typically refers to the plane defined by holographic medium that encompasses the X and Y linear directions or dimensions. The X and Y linear directions or dimensions are typically referred to herein, respectively, as the dimensions known as length (i.e., the X-dimension) and width (i.e., the Y-dimension).

For the purposes of the present invention, the terms "Z-direction" and "Z-dimension" refer interchangeably to the linear dimension or direction perpendicular to the X-Y plane, and is typically referred to herein as the linear dimension known as thickness.

For the purposes of the present invention, the term "data modulator" refers to any device that is capable of optically representing data in one or two-dimensions from a signal beam.

For the purposes of the present invention, the term "spatial light modulator" (SLM) refers to a data modulator device that is an electronically controlled, active optical element.

For the purposes of the present invention, the term "refractive index profile" refers to a two-dimensional (X, Y) mapping of the refractive index pattern recorded in a holographic storage medium.

For the purposes of the present invention, the term "data beam" refers to a recording beam containing a data signal. As used herein, the term "data modulated beam" refers to a data beam that has been modulated by a modulator such as a spatial light modulator (SLM).

For the purposes of the present invention, the terms "dynamic range" or "M#" relate to an intrinsic property of a holographic medium and refer to the total response of that medium when portioned among the one or more holograms recorded in a common volume and related to the index change and thickness of that medium. See Shelby, "Media Requirements for Digital Holographic Data Storage," *Holographic Data Storage*, Section 1.3 (Coufal, Psaltis, Sincerbox Eds. 2003).

For the purposes of the present invention, the term "scanner" refers to a steering device for a light beam used to read, analyze, etc., images recorded in a holographic storage medium.

For the purposes of the present invention, the term "actuator" refers to a device (e.g., electromechanical device), such as a solenoid, piezo actuator, lead screw actuators, linear steppers, electrostrictive actuators (also referred to as muscle wire), shaped memory alloy (e.g., nitinol) actuators, etc.), motor, motor assembly, etc., that causes, imparts, etc., motion, movement, etc.

For the purposes of the present invention, the term "voice coil" refers to a solenoid-type actuator.

For the purposes of the present invention, the term "gimbal" refers to a mechanical device, means, mechanism, suspension, etc., that allows or enables the pivoting, rotation, etc., of an object in multiple dimensions. A gimbal may be made up of two or three pairs of pivots mounted, connected, linked, joined, etc., on axes at right angles (i.e., orthogonally or perpendicularly). For example, a three-axis gimbal may allow or enable a mounted object to remain in a horizontal plane regardless of the motion of its support. An example of a two-axis gimbal is a Cardan suspension.

For the purposes of the present invention, the term "Cardan suspension" refers to a joint, linkage, connection, etc., between two other components, for example, two rigid rods, which allows or enables the components (e.g., rigid rods) which are joined, linked, connected, etc., to bend, pivot, in any direction, relative to the joint, linkage, connection, etc. A Cardan suspension may also be referred to as a "universal joint," U-joint, Cardan joint, Hardy-Spicer joint, Hooks's joint, etc. One example of a Cardan suspension may comprise a pair of hinges joined, linked, connected to each other, or located close together, but where the hinges are joined, linked, connected, oriented, etc., such that the respective pivot, rotational, etc., axes of the hinges are orthogonal (perpendicular) to each other.

For the purposes of the present invention, the term "tilt axis" refers to an axis for defining the relative angular rotation, pivoting, tilting, slanting, etc., of a reflector member. The tilt axis may be a vertical axis, a horizontal axis, etc.

For the purposes of the present invention, the term "tilt orientation" refers to the relative angle of rotation pivoting, tilting, slanting, etc., of a reflector member relative to one or more tilt axes. The tilt orientation may be measured or referred to in, for example, degrees.

For the purposes of the present invention, the term "position feedback" refers to an electronic signal which contains data, information, etc., about the tilt orientation of one or more tilt axes of the reflector member.

For the purposes of the present invention, the term "position feedback circuit" refers to the circuit which contains the associated position feedback for one of the tilt axes.

For the purposes of the present invention, the term "magnet" refers to any component, element, part, material, etc., that produces a magnetic field.

For the purposes of the present invention, the term "polarity" refers to the orientation of the north and south poles of a magnet.

For the purposes of the present invention, the term "magnetic field" refers to the conventional meaning of this term, namely an axial vector field that traces out the solenoidal lines of force in and around a magnet.

For the purposes of the present invention, the term "magnetic field sensor" refers to an electronic device, component, etc., for example, a transducer, such as a Hall effect sensor, that senses, detects, etc., magnetic fields and provides an output signal that varies depending upon the strength and direction of the magnetic field.

For the purposes of the present invention, the term "Hall effect sensor" refers to a magnetic field sensor (e.g., a transducer) that utilizes the "Hall" effect to detect magnetic fields by varying the output voltage in response to changes in magnetic field density.

For the purposes of the present invention, the term "decoupled" refers to position feedback which has a relatively well-isolated tilt axis orientation detection, wherein the tilt orientation in one tilt axis produces a large output change in the position feedback circuit associated with that one axis, and wherein the tilt orientation in the other tilt axis produces a small output change in the position feedback circuit associated with that other axis.

For the purposes of the present invention, the term "small output change" refers to minimal or no detectable change in the output signal from one of the position feedback circuits.

For the purposes of the present invention, the term "large output change" refers to a significant and easily detectable change in the output signal from one of the position feedback circuits.

DESCRIPTION

Figure 1:
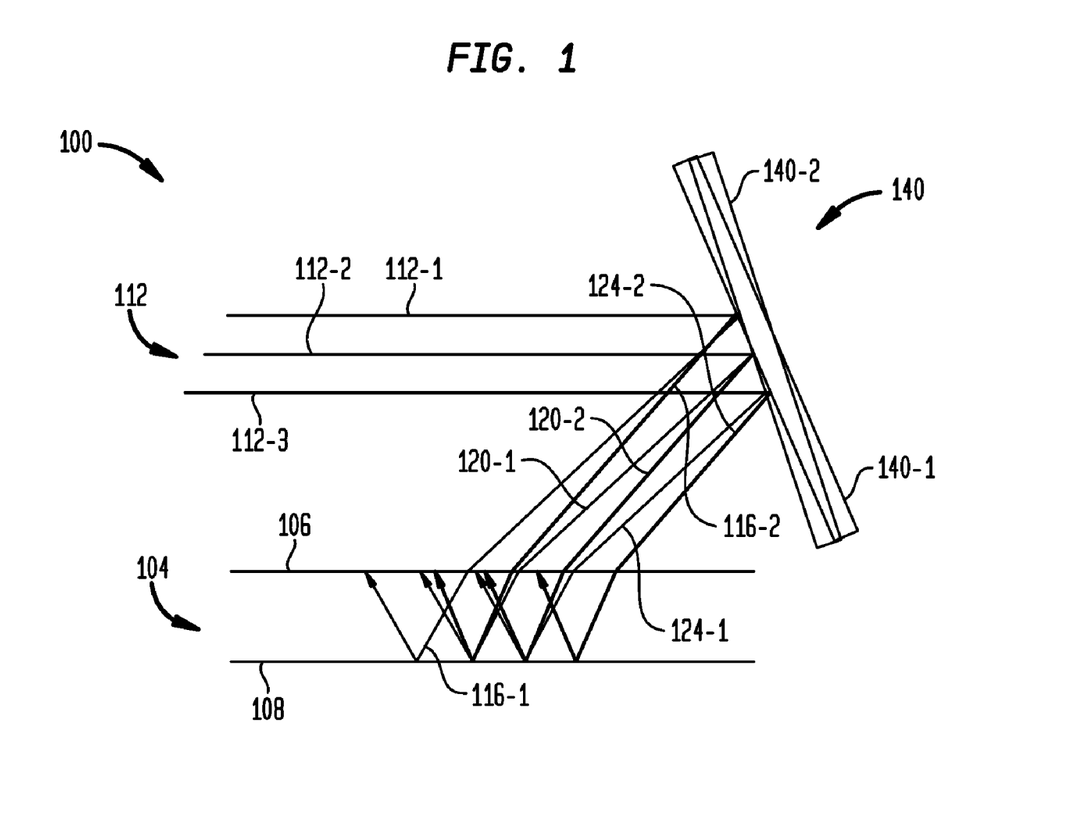
FIG. 1 represents an illustrative readout scanning carried out using a conventional galvo scanner (as the readout scanner) of data recorded in a holographic storage medium by angle multiplexing involving one-axis mirror motion.

The present invention relates to a scanner that is able to scan in two axes of motion. FIG. 1 represents an illustrative readout scanning carried out using a conventional galvo scanner (as the readout scanner), indicated generally as 100, of data recorded in a holographic storage medium by angle multiplexing. Readout scanner 100 is shown with a holographic storage medium 104 which has an upper surface 106, and a reflective backing 108 to facilitate miniaturization. The incoming readout reference beam 112 is represented by three lines corresponding to the top of the beam (beam line 112-1), middle of the beam (beam line 112-2), and the bottom of the beam (beam line 112-3). Scan 116 (see beam lines 116-1 and 116-2) represents the start angle, scan 120 (see beam lines 120-1 and 120-2) the middle angle, and scan 124 (see beam lines 124-1 and 124-2) the end angle of the dynamic range. Also shown in FIG. 1 is a scanning mirror 140 which may be adjusted or pivoted to different angles (e.g., represented by positions 140-1 and 140-2). Beam lines 116-1 and 116-2 represent the respective reflections of the top beam 112-1 when mirror 140 is at, respectively, positions 140-1 and 140-2. Similarly beam lines 120-1 and 120-2 represent the respective reflections of middle beam 112-2 when mirror 140 is at, respectively, positions 140-1 and 140-2, while beam lines 124-1 and 124-2 represent the respective reflections of bottom beam 112-3 when mirror 140 is at, respectively, positions 140-1 and 140-2.

The conventional galvo scanner 100, as illustrated in FIG. 1, also provides only one-axis mirror motion for scanning mirror 140. One-axis motion of scanning mirror 140 may require very precise holographic storage media location with respect to the incoming read out illumination. By contrast, a scanner which is able to scan in two axes of motion may reduce these positional tolerance requirements for the scanner.

Figure 2:
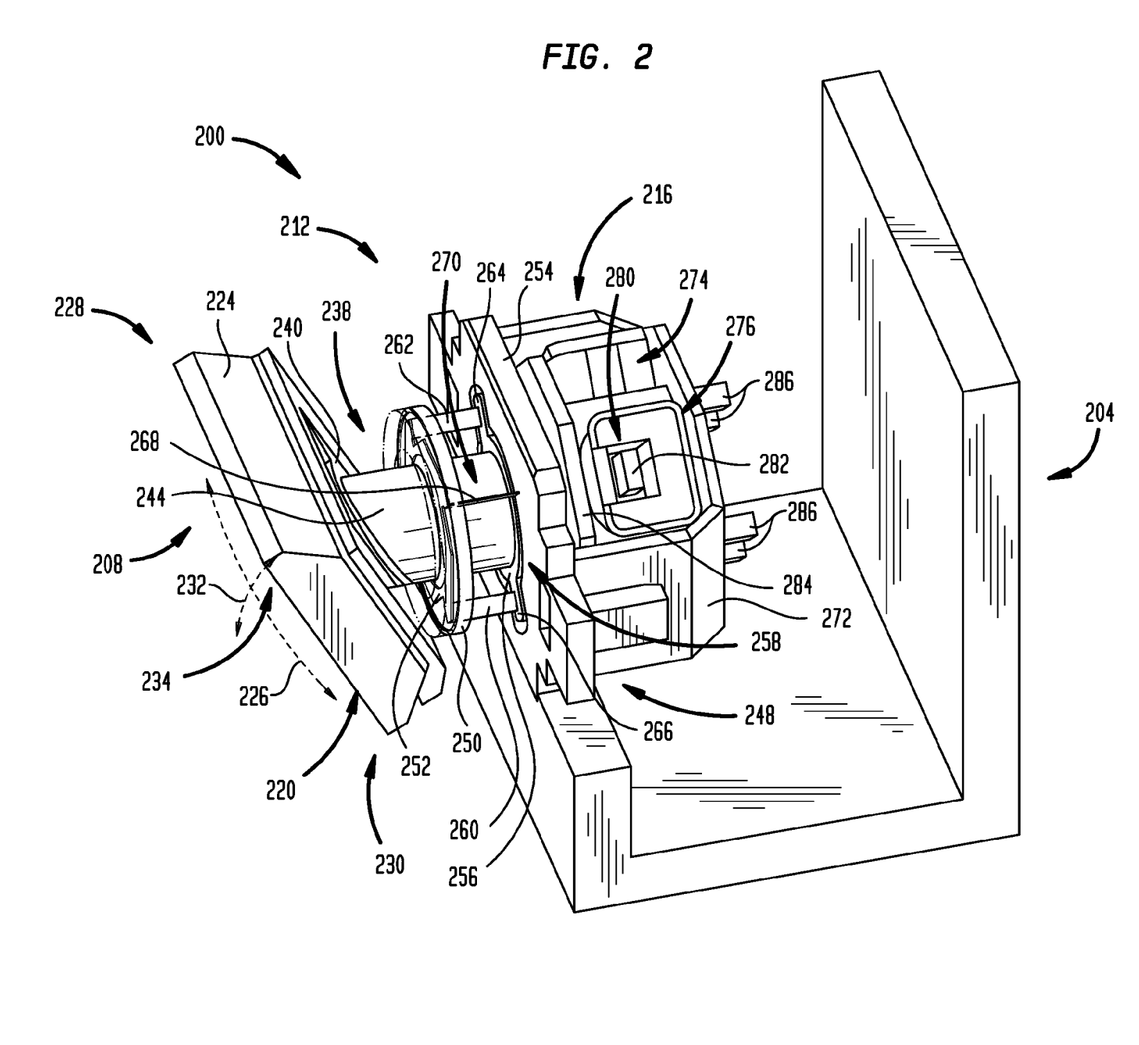
FIG. 2 is a perspective view of an embodiment of a two-axis scanner according to the present invention.
Figure 3:
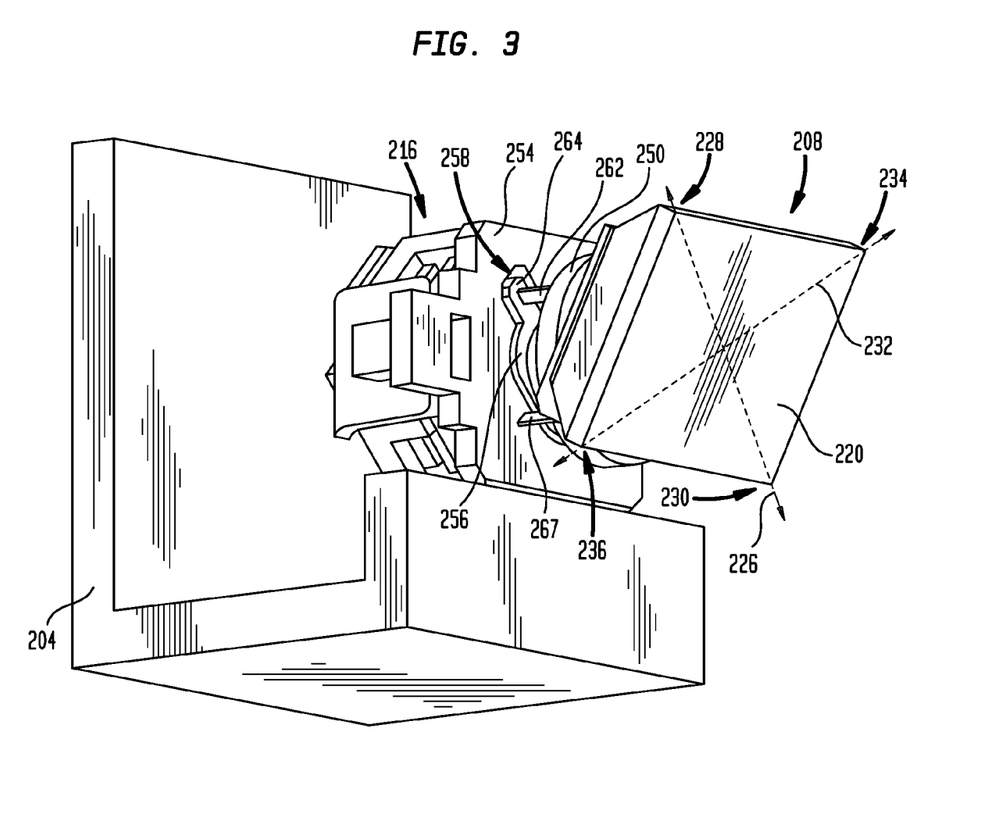
FIG. 3 is a frontal view of the scanner of FIG. 2 showing the scanning mirror and tilt axes.

An embodiment of a two-axis motion scanner is shown in FIGS. 2 and 3, and is indicated generally as 200. Scanner 200 comprises a base member, indicated generally as 204, a scanning beam reflective member which may be in the form of, for example, a scanning mirror, indicated generally as 208, a mounting assembly for mounting mirror 208 on base member 204 in the form of, for example, a reflective member suspension assembly, indicated generally as 212, and an actuator for causing suspension assembly 212 to tilt mirror 208 in the form of, for example, a motor assembly, indicated generally as 216. As shown in FIG. 2, mirror 208 comprises a generally square-shaped reflective surface or face, indicated as 220, and a mirror body, indicated as 224, to which reflective face 220 is attached, secured, etc. As shown in FIG. 2 and especially in FIG. 3, mirror 208 has a first tilt axis, indicated by dashed double-headed arrow 226, which extends diagonally from upper first corner 228 of to opposite lower second corner 230 of reflective face 220 of mirror 208. As further shown in FIG. 2 and especially in FIG. 3, mirror 208 has a second tilt axis, indicated by dashed double-headed arrow 232 which extends diagonally from upper third corner 234 to opposite lower fourth corner 236 of reflective face 220 of mirror 208.

Referring to FIG. 2, suspension assembly 212 comprises reflective member holder assembly 238 which includes a reflective member holder in the form of mirror mounting plate, indicated as 240, for holding mirror 208, and a generally cylindrical shaft, indicated as 244, which is connected to mounting plate 240. Suspension assembly 212 further comprises mirror tilt imparting assembly, indicated generally as 248, which includes an annular spring holder 250 which holds a spring member, indicated generally 252, a stationary outer frame, indicated as 254, which is mounted on base member 204, and a tiltable inner ring, indicated as 256, which receives shaft 244 and is separated from outer frame 254 by a gap, indicated as 258. Spring holder 250 is mounted on or connected to inner ring 256 by a first pair of diagonally opposed spring segments, indicated as 260 and 262, of spring member 252 which are received by respective outwardly protruding and opposed pair of lobes 264 and 266 of inner ring 256. Similarly, spring holder 250 is mounted on or connected to outer frame 254 by a second pair of diagonally opposed spring segments of spring member 252, indicated as 267 and 268 (see FIGS. 2 and 3).

As further shown in FIG. 2, spring segments 260/262 are relatively thick in one dimension perpendicular to the main longitudinal axis (i.e., along the axis connecting spring holder 252 to inner ring 256), and relatively thin in the other dimension perpendicular to the main longitudinal axis such that spring segments 260/262 may flex or bend. Similarly, spring segments 267/268 are relatively thick in one dimension perpendicular to the main longitudinal axis (i.e., along the axis connecting spring holder 252 to outer frame 254), and relatively thin in the other dimension perpendicular to the main longitudinal axis (and perpendicular to the thicker dimension) such that spring segments 267/268 may also flex or bend. In addition, and as shown in FIG. 2, the thicker dimension of each spring segments 260/262 are in the same plane, and are perpendicular to the plane of the thicker dimension of spring segments 267/268. Similarly, the thinner dimension of each spring segments 260/262 are also in the same plane, and are also perpendicular to the plane of the thinner dimension of spring segments 267/268.

Tiltable inner ring 256 may tilt, relative to stationary outer frame 254, along one or both of two tilt axes, the first of which extends from lobe 264 and 266, is generally aligned with the plane of the thicker dimension of the first spring segments 260/262, and is generally aligned with first tilt axis 226 of mirror 208. The second tilt axis of inner ring 256 is orthogonal or perpendicular to the first tilt axis of inner ring 256, is generally aligned with the plane of the thicker dimension of the second spring segments 267/268, and is generally aligned with second tilt axis 232 of mirror 208. Spring holder 250 also connects inner tiltable ring 256 to outer frame 254 through respective spring segments 260/262 and 267/268 of spring member 252. Accordingly, the combination of spring holder 250, spring segments 260/262 and 267/268 (of spring member 252), and inner ring 256, in essence, hangs from or is suspended by outer frame 254, with the suspension center point of tilt imparting member 248 being indicated as 270.

Because spring holder 250 and inner ring 256 hang from or are suspended by outer frame 254, and because of the connection through spring segments 260/262 and 267/268 (of spring member 252), the equivalent of a Cardan suspension or universal joint is created between two orthogonal "hinge" portions of tilt imparting assembly 248, with each pair of spring segments 260/262 and 267/268 corresponding to one of these two orthogonal "hinge" portions. Because shaft 244 of mirror holder assembly 238 is received by inner ring 256, mirror holder assembly 238 moves and tilts in response to the tilting of inner ring 256, thus imparting a corresponding tilt to mirror 208. Accordingly, when inner ring 256 tilts along, for example, the first tilt axis of inner ring 256, spring segments 260/262 remain relatively straight or taut while spring segments 267/268 bend and flex, with mirror holder assembly 238 and thus mirror 208 tilting along first tilt axis 226. Conversely, when inner ring 256 tilts along the second axis perpendicular to the first axis of inner ring 256, spring segments 267/268 remain relatively straight or taut while spring segments 260/262 bend and flex, with mirror holder assembly 238 and thus mirror 208 tilting along the second tilt axis 232. Inner ring 256 may also be tilted along both axes thereof at the same time, thus causing spring segments 267/268 and 260/262 to flex and bend, with mirror holder assembly 238 and thus mirror 208 tilting along both first tilt axis 226 and second tilt axis 232.

Referring initially to FIG. 2, motor assembly 216 comprises a motor housing, indicated as 272, a pair of diagonally opposed first tilt axis motor coils, one of which is indicated as 274, and a pair of diagonally opposed second tilt axis motor coils, one of which is indicated as 276. Motor assembly 216 further comprises a generally cross-shaped inner yoke 280 having four outwardly extending poles, one of which is shown and indicated as 282 extending through motor coil 276, an outer generally octagonal-shaped yoke 284 to which shaft 244 is connected or attached, and four solder lugs, indicated as 286. Inner yoke 280 and outer yoke 284 direct the magnetic flux from a magnet 290 (see FIG. 5) positioned between the inner yoke 280 and outer yoke 284 so that the flux passes generally at right angles (i.e., orthogonally and perpendicularly) through one wall of each of motor coils 274 and 276. Each solder lug 286 is also connected to one of the motor coils 274 and 276 and terminates at a coil driver circuit wire (not shown).

Figure 5:
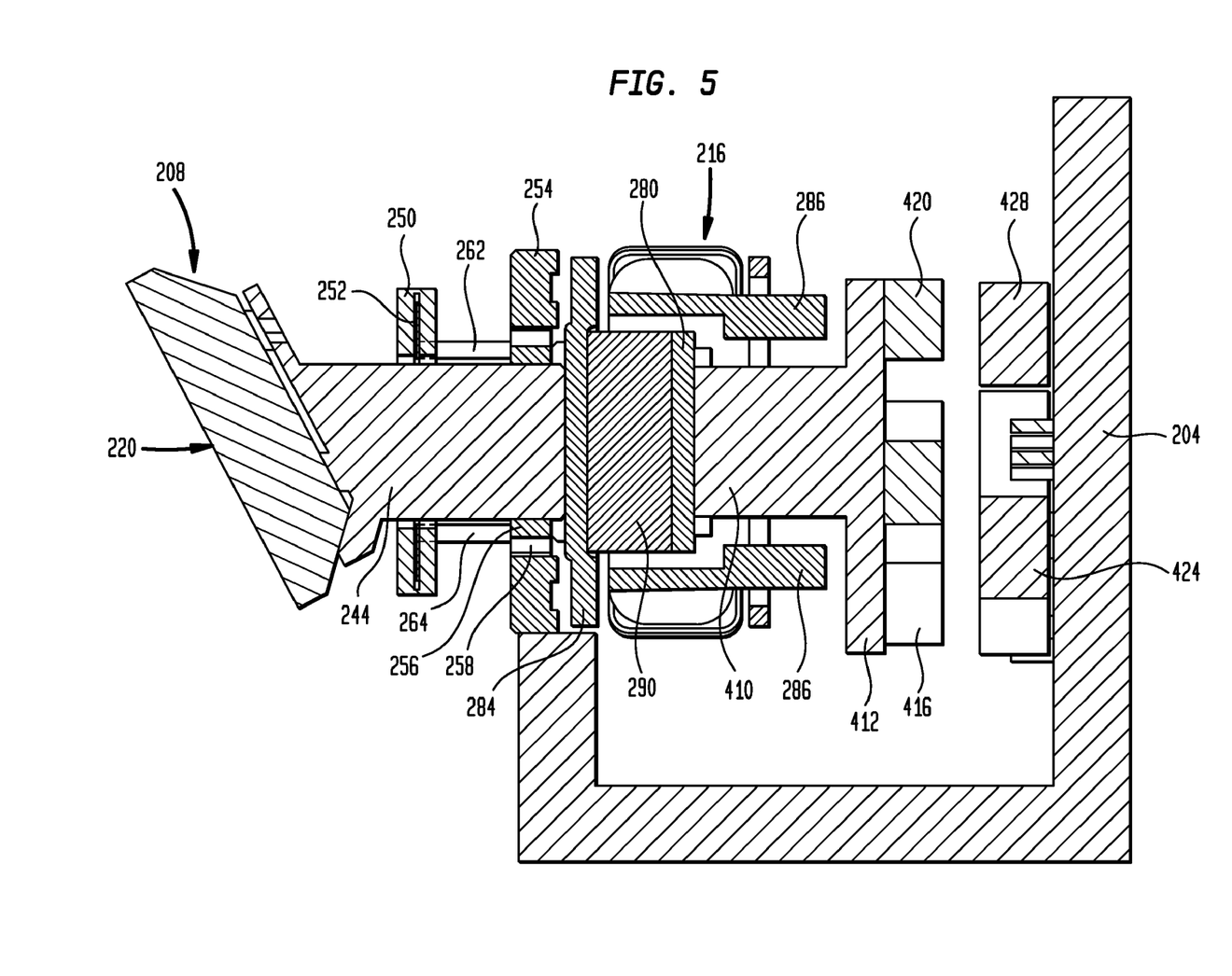
FIG. 5 is a sectional view taken along line 5-5 of FIG. 4.

Because outer yoke 284 is connected to shaft 244 (which is connected to inner ring 256), and inner yoke 280 is connected to outer yoke 284 (via magnet 290 as shown in FIG. 5), the combination of inner yoke 282 and outer yoke 284 is thus united with, and moves or tilts in concert with, inner ring 256. In addition, two of poles 282 of inner yoke 280 may be generally aligned along a first axis extending through the opposed pair of motor coils 274, this first axis of inner yoke 280 also being generally aligned with the first axis (i.e., extending from lobe 264 to lobe 266) of inner ring 256. Motor coils 274 may be, actuated, energized, etc., to cause inner yoke 280 to thus move and tilt along this first axis of inner yoke 280, thereby causing inner ring 256 to move and tilt in concert along the first axis of inner ring 256. Accordingly, motor coils 274 provide the motive force in scanner 200 for causing mirror 208 (via the combination of outer yoke 284/ inner yoke 280, tilt imparting assembly 248, and mirror holder assembly 238) to tilt along first tilt axis 226.

Similarly, the other two poles 282 of inner yoke 280 are aligned along a second axis perpendicular to the first axis of inner yoke 280, and extending through the opposed pair of motor coils 276, this second axis of inner yoke 280 also being generally aligned with the second tilt axis (i.e., perpendicular to the first tilt axis) of inner ring 256. Motor coils 276 may be actuated, energized, etc., to cause inner yoke 280 to thus move and tilt along the second axis of inner yoke 280, thereby causing inner ring 256 to move and tilt in concert along the second axis of inner ring 256. Accordingly, motor coils 276 provide the motive force in scanner 200 for causing mirror 208 (also via the combination of outer yoke 284/inner yoke 280, tilt imparting assembly 248 and mirror holder assembly 238) to tilt along second tilt axis 232.

While scanner 200 of FIGS. 2 and 3 provides or imparts two-axis tilting of mirror 208 (i.e., along first tilt axis 226 and second tilt axis 232), it has been discovered that scanner 200 may need to provide position feedback to motor assembly 216 of the tilt orientation of mirror 208 other than by, for example, attempting to read hologram data and thus deduce the tilt orientation of mirror 208 manually. Such manual feedback to motor assembly 216 may place restrictions on, for example, the holographic storage system data throughput rate, susceptibility to shock, vibration, and/or other environmental disturbances, etc.

Figure 4:
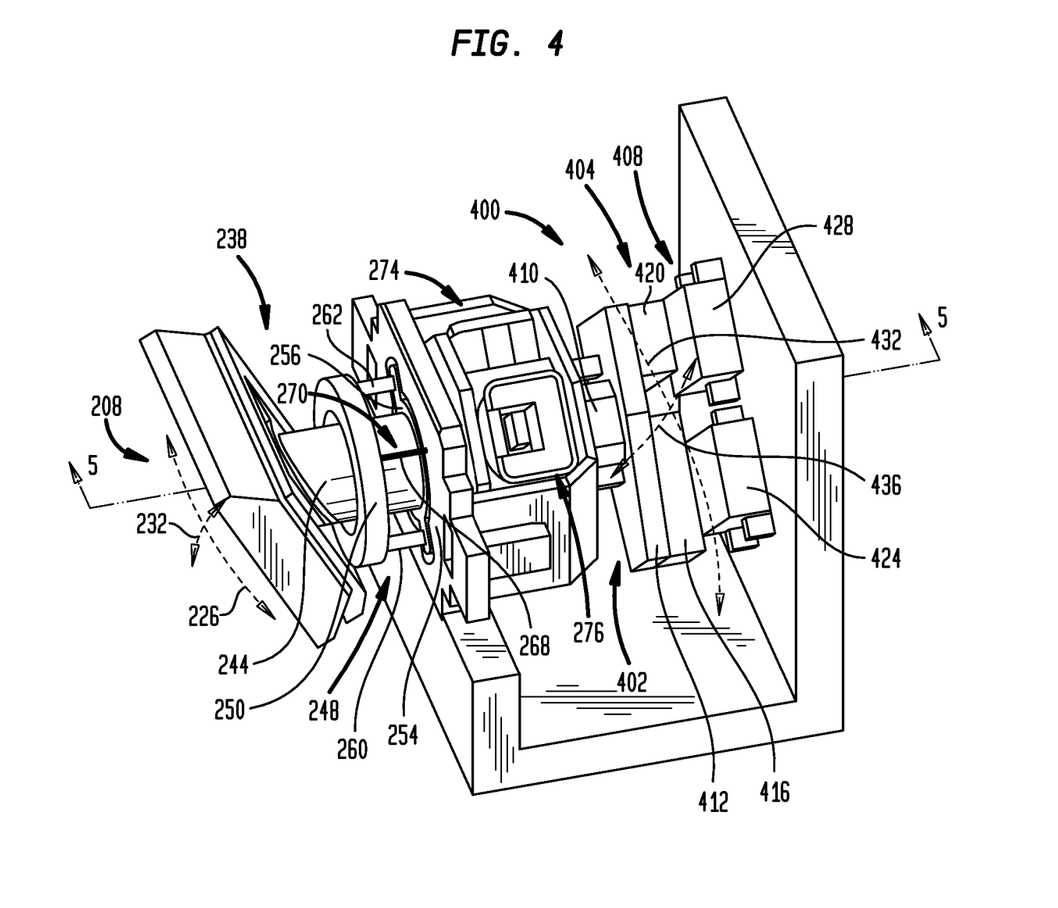
FIG. 4 is another perspective view similar to that of FIG. 2 but also showing an embodiment of an assembly for providing position feedback to the scanner device.
Figure 6:
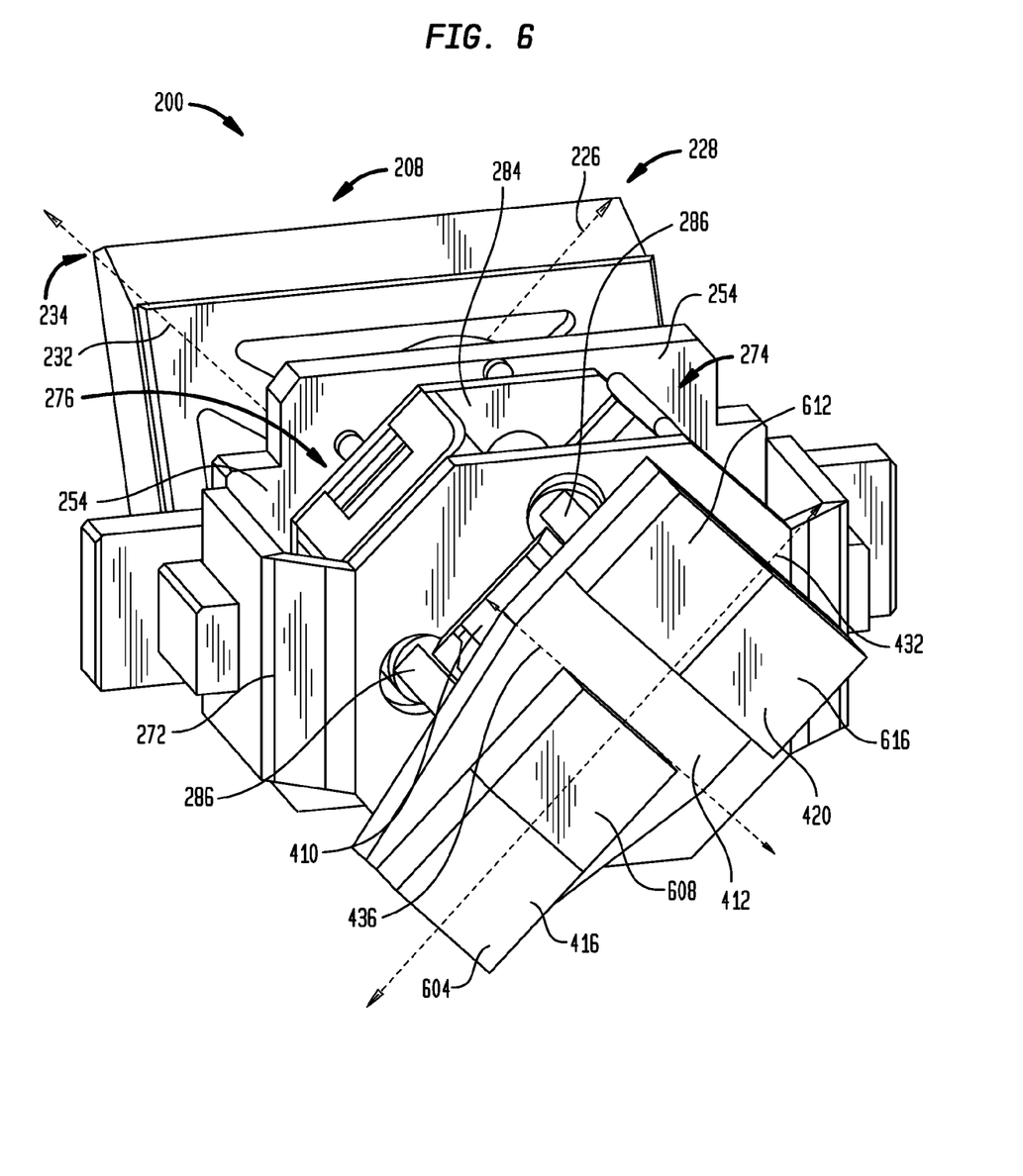
FIG. 6 is perspective view of scanner device shown in FIG. 4 from a rearward angle to illustrate various features of the assembly for providing position feedback.

FIGS. 4 through 6 illustrate a position feedback assembly for scanner 200, the position feedback assembly being indicated generally as 400. Position feedback assembly 400 comprises a mounting assembly, indicated generally as 402, a magnet assembly, indicated generally as 404, and a magnetic field sensor assembly, indicated generally as 408. Mounting assembly 402 comprises a mounting shaft 410 (which is connected to and generally aligned with shaft 244 through the combination of inner yoke 280 and outer yoke 284, as shown in FIG. 5), and a magnet mounting plate 412 connected to shaft 410. Magnet assembly 404 comprises a first tilt axis motion magnet, indicated as 416, and a second tilt axis motion magnet, indicated as 420. Magnetic field sensor assembly 408 comprises a first magnetic field sensor, indicated as 424, and a second magnetic field sensor, indicated as 428. Magnetic field sensor assembly 408 further includes electronic circuitry (not shown), for example, a circuit board on which sensors 424 and 428 may be mounted, for transferring, transmitting, etc., signals from sensors 424 and 428 to motor assembly 216 to thus provide position feedback on the tilt orientation of mirror 208 detected by sensors 424 and 428. As further shown in FIG. 4 and especially FIG. 6, the first axis of motion of magnet assembly 404 is indicated by double-headed dashed arrow 432 (which, as shown in FIG. 6, is generally aligned with first tilt axis 226), while the second axis of motion of magnet assembly 404 is indicated by double-headed dashed arrow 436 (which, as shown in FIG. 6, is generally aligned with second tilt axis 232) and is perpendicular to the first motion axis 432. Referring to FIG. 6, first magnet 416 comprises a first magnetic pole 604 (arbitrarily designated as the north pole) and second magnetic pole 608 (arbitrarily designated as the south pole) oriented along first motion axis 432, while second magnet 420 comprises a first magnetic pole 612 (arbitrarily designated as the north pole) and second magnetic pole 616 (arbitrarily designated as the south pole) oriented along second motion axis 436 orthogonally or perpendicularly to first motion axis 432.

As illustrated in FIGS. 4 through 6, position feedback assembly 400 provides scanner 200 with a non-contact two tilt axis orientation position feedback assembly integrated into the motor end of scanner 200. Position feedback assembly 400 has two magnets 416 and 420 mounted on and oriented with respect to each other on mounting plate 412 of mounting assembly 402, so that magnets 416 and 420 may move in concert with the tilting of mirror 208, as represented by first motion axis 432 which moves in concert with first tilt axis 226, and second motion axis 436, which moves in concert with second tilt axis 232, to thereby indicate the tilt orientation of mirror 208. Magnetic field sensors 424 and 428, each of which may be, for example, output Hall effect sensors, may be mounted facing and adjacent to respective magnets 416 and 420. Because sensors 424 and 428 are normally fixedly positioned with respect to magnets 416 and 420, movement of these magnets 416 and 420 along first motion axis 432 and/or second motion axis 436 (which also indicates the respective tilt orientation of mirror 208) detected by sensors 424 and 428 may be used to accurately relay or transfer the respective tilt orientation of mirror 208 along first tilt axis 226 and/or second tilt axis as position feedback to motor assembly 216. While FIGS. 4 through 6 illustrate position feedback assembly 400 being mounted onto the end of motor assembly 216, position feedback assembly 400 may also be mounted more integrally, for example, onto scanning mirror 208, inner and outer yokes 280 and 284, etc., for smaller assembly size.

As illustrated especially in FIG. 6, magnets 416 and 420 may be arranged orthogonally or perpendicularly to each other, i.e., the axis of first magnet 416 (from pole 604 to pole 608) is generally aligned with first motion axis 432 and the axis of second magnet 420 (from pole 612 to pole 616) is generally aligned with the second motion axis 436 which is orthogonal or perpendicular to first motion axis 432). While magnets 416 and 420 are shown in FIG. 6 as being arranged so that their orientation (i.e., as defined, respectively, by first motion axis 432 and second motion axis 436) is generally aligned with the two physical and orthogonal axes of motion of motor assembly 216 (i.e., as defined, respectively, by one pair of poles 282 extending through motor coils 274, and the other pair of poles 282 extending through motor coils 276), this is not essential, as the tilt orientation of mirror 208 along each of tilt axes 226 and 232 may also be determined and indicated by a combination of the movement and position of magnets 416 and 420.

Figure 7:
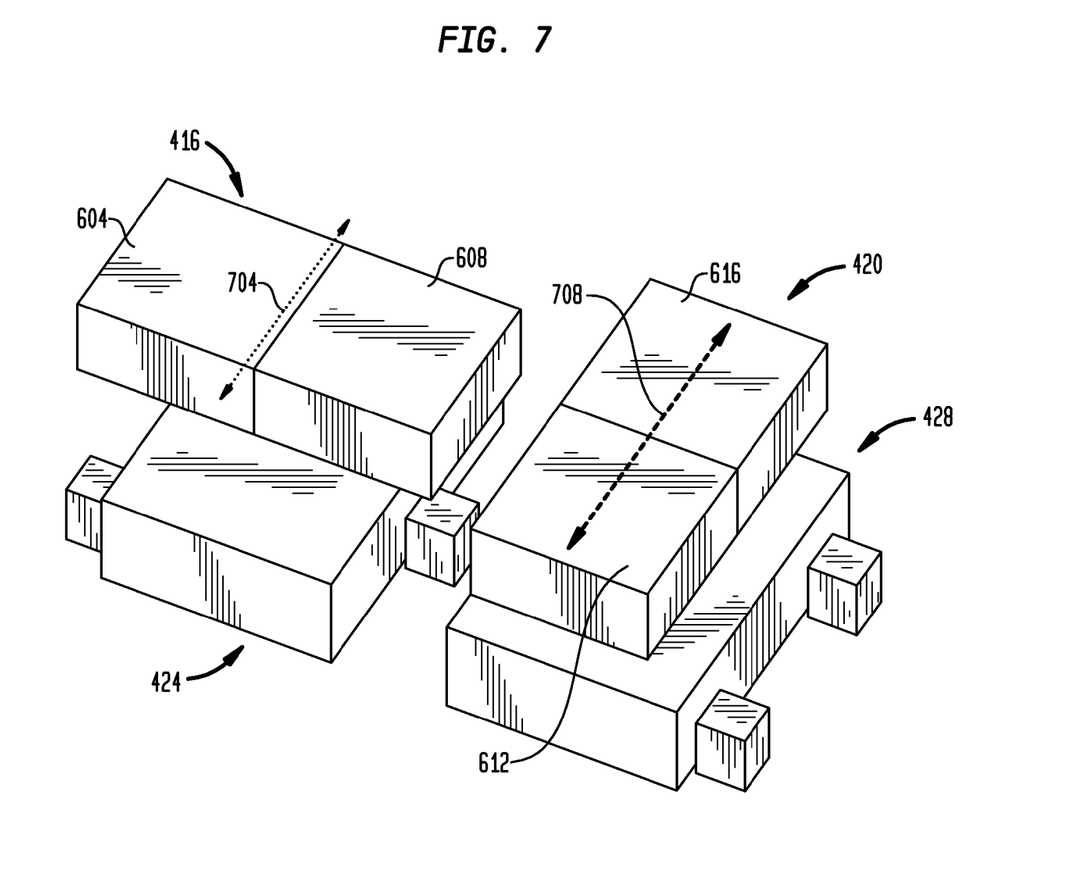
FIG. 7 is a schematic view illustrating the magnetic field sensor response for the first tilt axis of the scanner mirror.
Figure 8:
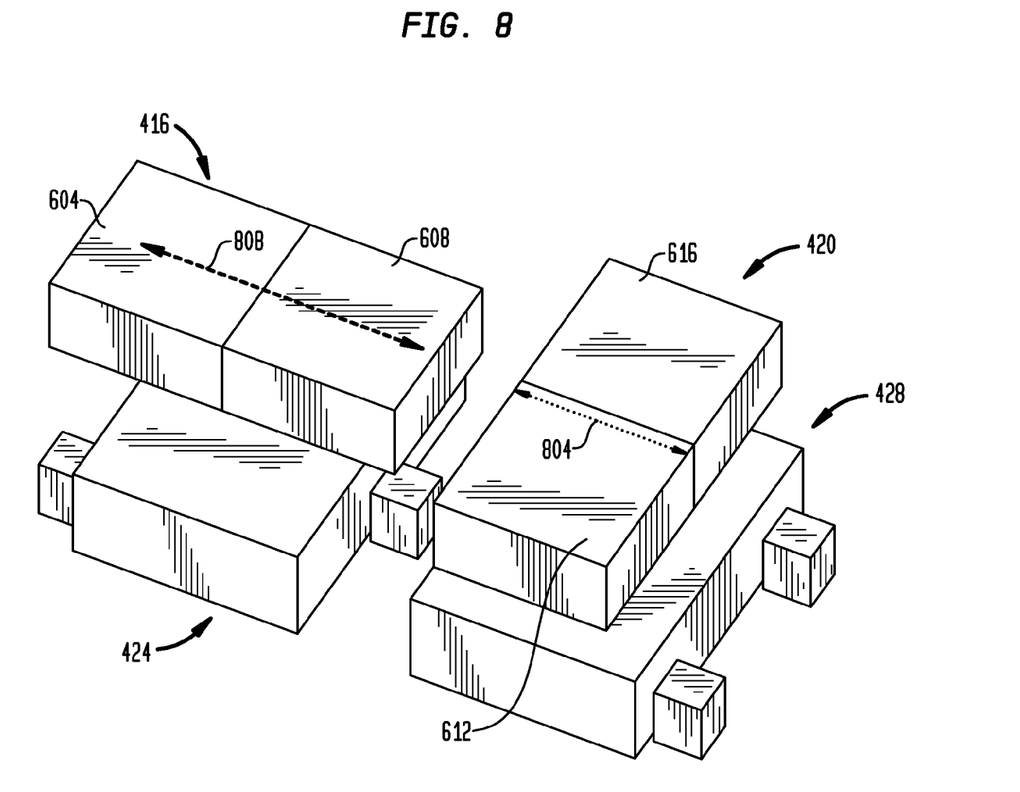
FIG. 8 is a schematic view illustrating the magnetic field sensor response for the second tilt axis of the scanner mirror.

The orthogonal arrangement of magnets 416 and 420 and the corresponding positioning of the magnetic field sensors 424 and 428 illustrated in FIGS. 4 through 6 may be beneficial in causing the two sensor outputs (from sensors 424 and 428) to be relatively well decoupled from each other, thus reducing the signal processing requirements for discerning independently the tilt orientation of mirror 208 along tilt axes 226 and 232. These particular magnet and sensor arrangements are further illustrated schematically in FIGS. 7 and 8. FIG. 7 illustrates a large output sensor response to the motion of second tilt axis 232, with thinner double headed dashed arrow 704 indicating a small input change for second tilt axis 232, and with thicker double headed dashed arrow 708 indicating a large output change for second tilt axis 232. Similarly, FIG. 8 illustrates a large output sensor response to the motion of first tilt axis 226, with thinner double headed dashed arrow 804 indicating a small input change for first tilt axis 226, and with thicker double headed dashed arrow 808 indicating a large output change for first tilt axis 226.

It should be appreciated that the specific embodiments illustrated in FIGS. 2 through 8 are provided to illustrate the teachings of the present invention. Alterations or modification within the skill of the art of the specific embodiments illustrated in FIGS. 2 through 8 are considered within the scope of the present invention, so long as these alterations or modifications operate in a same or similar manner, function, etc. These modifications may include the use of a single assembly, member, element, component, etc. (in place of a plurality of assemblies, members, elements, components, etc.), the use of a plurality of assemblies, members, elements, components, etc. (in place of a single of assembly, member, element, component, etc.), the changing of the order, orientation, direction, position, etc., of any of the assemblies, members, elements, components, etc., the combining or integrating of any of the assemblies, members, elements, components, etc., into a single or unified assembly, member element, component, etc., or the ungrouping of an assembly, member, element, component, etc., into a plurality of associated assemblies, members, elements, components, etc. For example, while the specific embodiments illustrated in FIGS. 2 through 8 show scanner 200 and position feedback assembly 400 being oriented generally horizontally, scanner 200 and position feedback assembly 400 may also be oriented generally vertically, or in any other orientation without departing from the scope of the present invention.

All documents, patents, journal articles and other materials cited in the present application are hereby incorporated by reference.

Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A device comprising a scanner comprising:

a base member;

a scanning beam reflective member having a first tilt axis and a second tilt axis orthogonal to the first tilt axis;

a reflective member mounting assembly for mounting the reflective member on the base member for tilting of the reflective member along the first and second tilt axes;

an actuator for causing the reflective member mounting assembly to tilt the reflective member along at least on of the first and second tilt axes to provide a tilt orientation;

a magnet assembly which generates one or more magnetic fields which are responsive and correlated to the tilt orientation; and a magnetic field sensor assembly for sensing the magnetic fields generated by the magnet assembly to thereby indicate the tilt orientation, wherein the reflective member mounting assembly comprises a reflective member tilt imparting assembly and a reflective member holder assembly connected to the tilt imparting assembly, wherein the reflective member holder assembly comprises a reflective member holder and a reflective member holder shaft connected to the reflective member holder, and wherein the tilt imparting assembly comprises a spring member, a spring holder which holds the spring member, an outer frame which is mounted on the base member, and a tiltable inner ring which receives the reflective member holder shaft, and wherein the spring member connects the outer frame and inner ring to the spring holder, wherein the spring member comprises a first pair of diagonally opposed spring segments which connect the spring holder to the inner ring along a first inner ring tilt axis, and a second pair of diagonally opposed spring segments which connect the spring holder to the outer frame along a second inner ring tilt axis perpendicular to the first inner ring tilt axis, and wherein the first inner ring tilt axis is generally aligned with the first tilt axis of the reflective member, and wherein the second inner ring tilt axis is generally aligned with the second tilt axis of the reflective member, wherein the actuator comprises an outer yoke connected to the reflective member holder shaft, a pair of diagonally opposed first tilt axis motor coils, a pair of diagonally opposed second tilt axis motor coils, an inner yoke connected to the outer yoke and having four outwardly extending poles, one pair of poles being aligned along a first inner yoke axis and extending through the first tilt axis motor coils, the other pair of poles being aligned along a second inner yoke axis and extending through the second tilt axis motor coils, wherein the first tilt axis motor coils are actuated to cause the reflective member to tilt along the first tilt axis of the reflective member, and wherein the second tilt axis motor coils are actuated to cause the reflective member to tilt along the second tilt axis of the reflective member.

2. The device of claim 1, wherein the reflective member comprises a scanning mirror having a reflective face which is generally square-shaped and wherein the first tilt axis extends diagonally from an upper first corner to an opposite lower second corner of the reflective face, and wherein the second tilt axis extends diagonally from an upper third corner to an opposite lower fourth corner of the reflective face.

3. The device of claim 1, which further comprises a magnet mounting assembly for mounting the magnet assembly on the actuator, wherein the magnet mounting assembly comprises a mounting shaft connected to the inner yoke and is generally aligned with the reflective member holder shaft.

4. The device of claim 3, wherein the magnet assembly comprises a first magnet and a second magnet, the first and second magnets being oriented with respect to each other, and moving with respect to the tilting of the reflective member, to thereby indicate the tilt orientation of the reflective member, and wherein the magnetic field sensing assembly detects the movement of the first and second magnets, to thereby detect the indicated tilt orientation.

5. The device of claim 4, wherein the indicated tilt orientation detected by the magnetic field sensing assembly is transmitted to the actuator.

6. The device of claim 5, wherein the first and second magnets are oriented to indicate a first axis of motion of the magnetic assembly which is generally aligned with the first tilt axis of the reflective member, and a second axis of motion of the magnetic assembly which is generally aligned with the second tilt axis of the reflective member.

7. The device of claim 6 wherein the first magnet is generally aligned with first motion axis, wherein the second magnet is generally aligned with the second motion axis, and wherein the second motion axis is orthogonal to the first motion axis.

8. The device of claim 4, wherein the magnetic field sensing assembly comprises a first magnetic field sensor positioned facing the first magnet, and a second magnetic field sensor positioned facing the second magnet.

9. The device of claim 8, wherein the first and second sensors are fixedly positioned with respect to the first and second magnets.

10. The device of claim 9, wherein the first sensor provides a first sensor output and wherein the second sensor provides a second sensor output, and wherein the first sensor output is relatively decoupled from the second sensor output.

11. The device of claim 8, wherein the first and second sensors are each Hall effect sensors.

12. A device comprising a scanner comprising:
a base member;
a scanning beam reflective member having a first tilt axis and a second tilt axis orthogonal to the first tilt axis;
a scanning beam reflective member suspension assembly comprising:
tilt imparting assembly for imparting tilt to the reflective member along at least of the first and second tilt axes to thereby provide a tilt orientation and which is mounted on the base member; and
a reflective member holder assembly for holding the reflective member and which is connected the tilt imparting assembly; and
an actuator for causing the tilt imparting assembly to impart tilt to the reflective member to thereby provide the tilt orientation,
wherein the reflective member comprises a scanning mirror having a reflective face which is generally square-shaped and wherein the first tilt axis extends diagonally from an upper first corner to an opposite lower second corner of the reflective face, and wherein the second tilt axis extends diagonally from an upper third corner to an opposite lower fourth corner of the reflective face,
wherein the reflective member holder assembly comprises a reflective member holder and a reflective member holder shaft connected to the reflective member holder,
wherein the tilt imparting assembly comprises a spring member, a spring holder which holds the spring member, an outer frame which is mounted on the base member, and tiltable inner ring which receives the reflective member holder shaft, and wherein the spring member connects the outer frame and inner ring to the spring holder,
wherein the spring member comprises a first pair of diagonally opposed spring segments which connect the spring holder to the inner ring along a first inner ring tilt axis, and a second pair of diagonally opposed spring segments which connect the spring holder to the outer frame along a second inner ring tilt axis perpendicular to the first inner ring tilt axis,
wherein the actuator comprises an outer yoke connected to the reflective member holder shaft, a pair of diagonally opposed first tilt axis motor coils, a pair of diagonally opposed second tilt axis motor coils, an inner yoke connected to the outer yoke and having four outwardly extending poles, one pair of poles being aligned along a first inner yoke axis and extending through the first tilt axis motor coils, the other pair of poles being aligned along a second inner yoke axis and extending through the second tilt axis motor coils, wherein the first tilt axis motor coils are actuated to cause the reflective member to tilt along the first tilt axis of the reflective member, and wherein the second tilt axis motor coils are actuated to cause the reflective member to tilt along the second tilt axis of the reflective member.

13. The device of claim 12, wherein the inner ring is separated from the outer frame by a gap.

14. The device of claim 13, wherein inner ring has protruding and opposed pair of lobes along the first inner ring tilt axis, each of the lobes receiving one of the first pair of spring segments, and wherein the first inner ring tilt axis is generally aligned with the first tilt axis of the reflective member, and wherein the second inner ring tilt axis is generally aligned with the second tilt axis of the reflective member.

15. The device of claim 14, wherein each of the first spring segments has a longitudinal axis, and two dimensions perpendicular to each first spring segment longitudinal axis and perpendicular to each other, one of the first spring segment dimensions being thicker than the other first spring segment dimension to thereby enable bending of the first spring segments, the thicker first spring segment dimension of each first spring segment being generally aligned with the first inner ring tilt axis; and wherein each of the second spring segments has a longitudinal axis, and two dimensions perpendicular to each second spring segment longitudinal axis and perpendicular to each other, one of the second spring segment dimensions being thicker than the other second spring segment dimension to thereby enable bending of the second spring segments, the thicker second spring segment dimension of each second spring segment being generally aligned with the second inner ring tilt axis, the thicker second spring segment dimensions being perpendicular to the thicker first spring segment dimensions.

16. The device of claim 15, wherein when the inner ring tilts along the first inner ring tilt axis, the second spring segments bend, and wherein when the inner ring tilts along the second inner ring tilt axis.

17. The device of claim 12, wherein the inner yoke is generally cross-shaped, wherein the first inner yoke axis is generally aligned with the first inner ring tilt axis, and wherein the second inner yoke axis is generally aligned with the second inner ring tilt axis.

* * * * *